United States Patent [19]
Williams

[11] 3,947,623
[45] Mar. 30, 1976

[54] LIMITED CONTACT SEPARATOR FOR LINEAR BODIES

[75] Inventor: Harrison L. Williams, Euclid, Ohio

[73] Assignee: Preformed Line Products Co., Cleveland, Ohio

[22] Filed: Apr. 14, 1975

[21] Appl. No.: 567,729

[52] U.S. Cl. .......................... 174/146; 174/DIG. 12
[51] Int. Cl.² ........................................ H02G 7/12
[58] Field of Search............ 174/27, 29, 40 R, 99 R, 174/146, DIG. 12

[56] References Cited
UNITED STATES PATENTS

| | | | |
|---|---|---|---|
| 2,085,077 | 6/1937 | Fox et al. | 174/146 |
| 2,109,817 | 3/1938 | Braun | 174/29 |
| 2,395,872 | 3/1946 | Isenberg | 174/29 |

FOREIGN PATENTS OR APPLICATIONS

| | | | |
|---|---|---|---|
| 269,917 | 3/1966 | Australia | 174/146 |

Primary Examiner—Laramie E. Askin
Attorney, Agent, or Firm—Hume, Clement, Brinks, Willian, Olds & Cook, Ltd.

[57] ABSTRACT

An appliance for linear bodies having a generally planar spacing member and a pair of helically preformed attachment elements which are positioned centrally of the spacing member and extend outwardly therefrom in a direction substantially normal to the plane thereof. The attaching elements engage a single linear conductor and the spacing member maintains adjacent conductors in spaced relation thereto.

6 Claims, 3 Drawing Figures

LIMITED CONTACT SEPARATOR FOR LINEAR BODIES

BACKGROUND OF THE INVENTION

The present invention relates generally to linear bodies such as electric transmission and distribution lines and, more specifically, to a device for maintaining a spaced relationship between a first linear body and an adjacent structure, such as a second linear body.

In modern suspended electrical transmission and distribution systems and in other systems wherein linear bodies are strung in close relation, the closely spaced conductors running in parallel, because of differential wind forces, ice loading and/or electro-magnetic attraction, may swing into contact with each other. Such contact may damage the conductors either by mechanical abrasion or by current transfer and arcing where the operating potentials of the adjacent conductors differ. Moreover, power conductors of differing phases may swing into close enough proximity to result in arc-over between lines without actual contact. Open wire telephone circuits with line wires spaced approximately one foot may, when tensioned lightly to avoid the effects of vibration, swing together and cause repeated "trip outs" of circuits.

These various problems have required the introduction of various forms of spacers and separators for the purpose of keeping conductors apart. For conductors maintained at the same potential, such spacers need not be insulating material; but where a potential difference exists, separating devices of good dielectric properties must be employed. Examples of such prior art separating devices are disclosed in U.S. Pat. Nos. 2,959,632 and 3,463,870. Generally, the prior art separators utilize a rigid member which is permanently attached to both adjacent conductors which are sought to be maintained in a spaced relationship. When such separators are employed with linear conductors of differing phases, it has been found that tracking may occur due to a low current flow which ultimately results in the structural failure of the device. Therefore, it has been found undesirable to utilize a separating device with linear conductors of differing phases which is attached permanently to both conductors.

SUMMARY OF THE INVENTION

Accordingly, the present invention is directed toward a separating device which will prevent contact between adjacent linear bodies thereby maintaining a spaced relationship between such bodies and which is permanently attached to only one of the linear conductors, having only limited contact with adjacent linear conductors. The separating device of the present invention is also constructed so as to withstand extreme environmental conditions and the high impact forces which may result from the relative movements of the linear conductors. In addition, the separating device includes structural features which prevent adjacent linear bodies from over-lapping or wrapping over one another due to extreme galloping which may occur when the linear conductors are subjected to high winds and the like. Finally, the present invention provides a separating device for linear bodies which is light weight and which may be easily installed by hand without the use of auxiliary tools.

BRIEF DESCRIPTION OF THE DRAWINGS

The novel features which are believed to be characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE INVENTION

Figure 1:
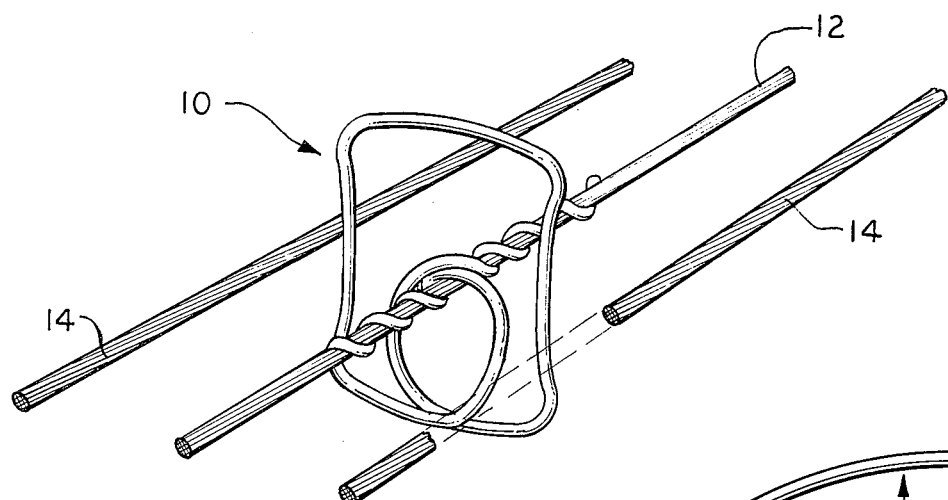
FIG. 1 is a perspective view showing the limited contact separator of the present invention in a typical installation; and, FIGS. 2 and 3 are end and side elevational views, respectively, showing in greater detail the structural features of the limited contact separator of the present invention.
Figure 2:
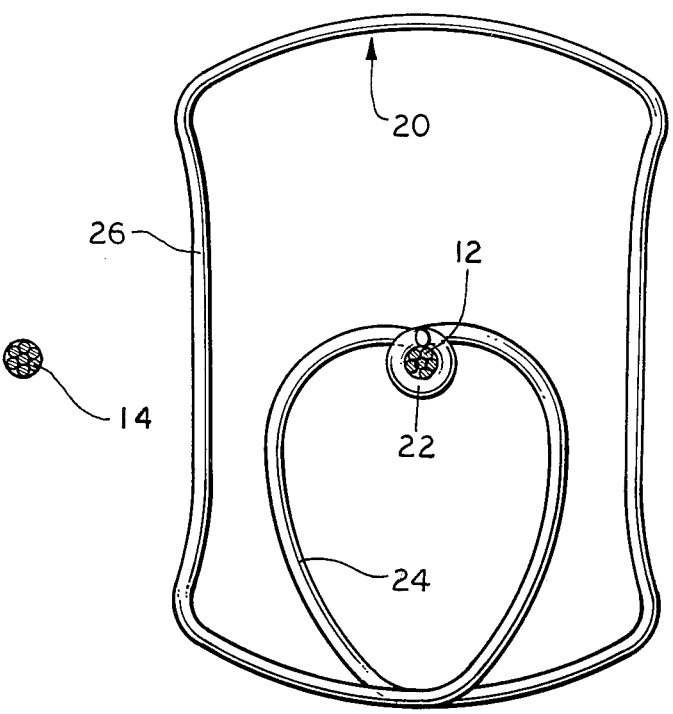

Referring now to FIG. 1, the limited contact separator of the present invention, designated generally as 10, is shown mounted on a linear conductor 12 and disposed between adjacent linear conductors 14. Preferably, the separator has a transverse dimension such that under normal conditions it is spaced from the adjacent conductors 14. As a general rule, it is most desirable that the separator 10 be constructed such that its lateral edge is spaced approximately mid-way between conductors 12 and 14, as is shown in FIG. 2.

The limited contact separator includes a substantially planar spacing member 20 and a pair of helically preformed attaching elements 22, the attaching elements 22 being positioned centrally on the spacing member 20 and extending outwardly therefrom in a direction substantially normal to the plane of the spacing member. Internal diameter of the helically preformed attaching elements 22 is nominally smaller than that of the conductor 12 so as to insure a secure gripping engagement of the conductor by the appliance.

It is most particularly preferred that the limited contact separator be formed from a continuous rod, tube, or the like. Thus, the appliance comprises a unitary and integral structure which is more easily manufactured and is capable of withstanding the forces generated by the impact of the adjacent linear conductors 14. When the limited contact separator is utilized with linear conductors of different phases, it is important that the device be constructed from a high dielectric material such as rigid polyvinyl chloride or polyethylene. Of course, a variety of materials may be used in the construction of the present invention and these are well known to those skilled in the art.

The limited contact separator 10 of the present invention may be installed on conductor 12 by hand, without the use of auxiliary tools. Preferably, the separators are mounted at spaced intervals either on a single conductor or on adjacent conductors in alternating sequence so as to equalize the load on each conductor throughout the span.

Figure 3:
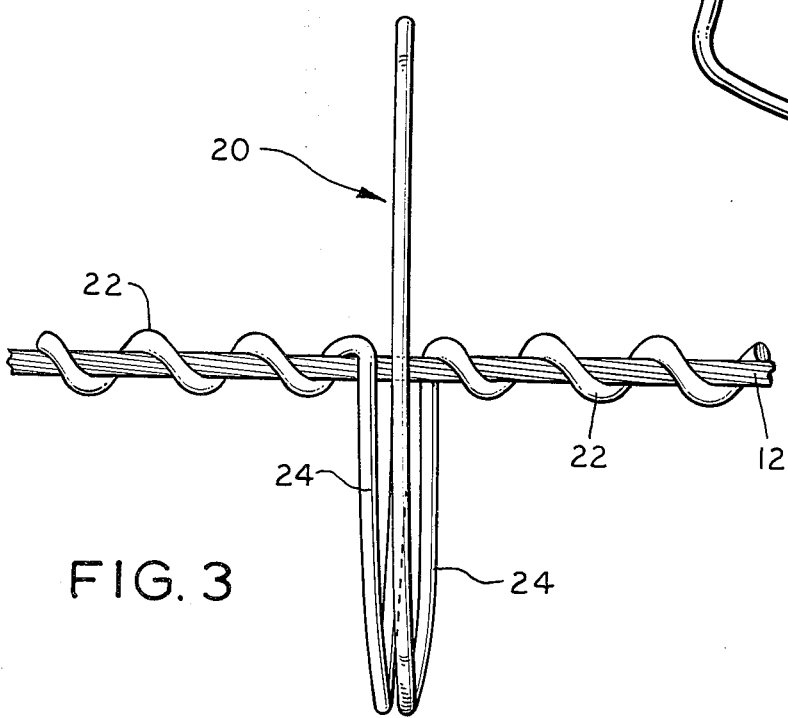

As can be clearly seen in FIG. 2, the spacing member 20 comprises preferably a generally rectangular shaped form. The spacing member 20 may also define a helix of closed pitch, as is shown in FIG. 3. This design assures that the appliance of the present invention has sufficient resilience and flexibility to withstand the forces resulting from lateral impact by adjacent linear conductors.

As has been noted hereinabove, the spacing member 20 and the attaching elements 22 may be constructed from a continuous rod. Thus, each attaching element also includes a base portion 24 which extends generally in the plane of the spacing member 20 outwardly or radially from the attaching element and into integral relation with the spacing member 20. As is illustrated in FIG. 2, it is most preferable that the base portion 24 of each attaching element extend outwardly from the attaching elements 22 in a curve of ever-increasing radius to the point where the base portion 24 integrally joins the spacing member 20. This design further assists in providing the desired resilient lateral compression of the appliance.

In accordance with a preferred embodiment of the present invention, the spacing member 20 includes lateral portions 26 which have a concave configuration. This design helps to prevent "wrap-over", wherein the adjacent linear conductors 14, due to excessive galloping, tend to slide over the top of the separator 10, thereby contacting the linear conductor 12 at points intermediate the limited contact separators. Thus, as an adjacent linear conductor 14 gallops, thereby moving vertically with respect to linear conductor 12, and into contact with the limited contact separator 10, the concave configuration of the lateral portion 26 tends to throw the adjacent conductor 14 away from conductor 12 thus preventing "wrap-over".

Of course, it should be understood that various changes and modifications of the preferred embodiments described herein will be apparent to those skilled in the art. Such changes and modifications can be made without departing from the spirit and scope of the present invention and without diminishing its attendant advantages. It is, therefore, intended that such modifications and changes be covered by the following claims.

I claim:
1. An appliance for linear bodies which will maintain adjacent linear bodies in spaced relationship, comprising:
   a substantially planar spacing member having a generally rectangular shape with concave lateral portions; and
   a pair of helically preformed attaching elements, each said element being positioned centrally of said spacing member and extending outwardly therefrom in a direction substantially normal to the plane of said spacing member.
2. The appliance of claim 1 wherein said spacing member and said attaching elements comprise a unitary structure.
3. The appliance of claim 1 wherein said spacing member and said attaching elements are constructed from a continuous rod-like member, each said attaching element having a base portion which extends in the plane of said spacing member outwardly therefrom and into integral relation with said spacing member.
4. The appliance of claim 3 wherein said base portion for each said attaching element extends in a curve of everincreasing radius to the point where said base portion integrally joins said spacing member.
5. The appliance of claim 1 wherein said spacing member also defines a helix of closed pitch whereby said spacing member is able to laterally compress in order to withstand impact from adjacent linear bodies.
6. The appliance of claim 1 wherein said spacing member and said attaching elements are composed of a high dielectric material.

* * * * *